H. KENYON.
POULTRY FEEDER AND DISINFECTOR.
APPLICATION FILED NOV. 7, 1921.
1,433,081.
Patented Oct. 24, 1922.
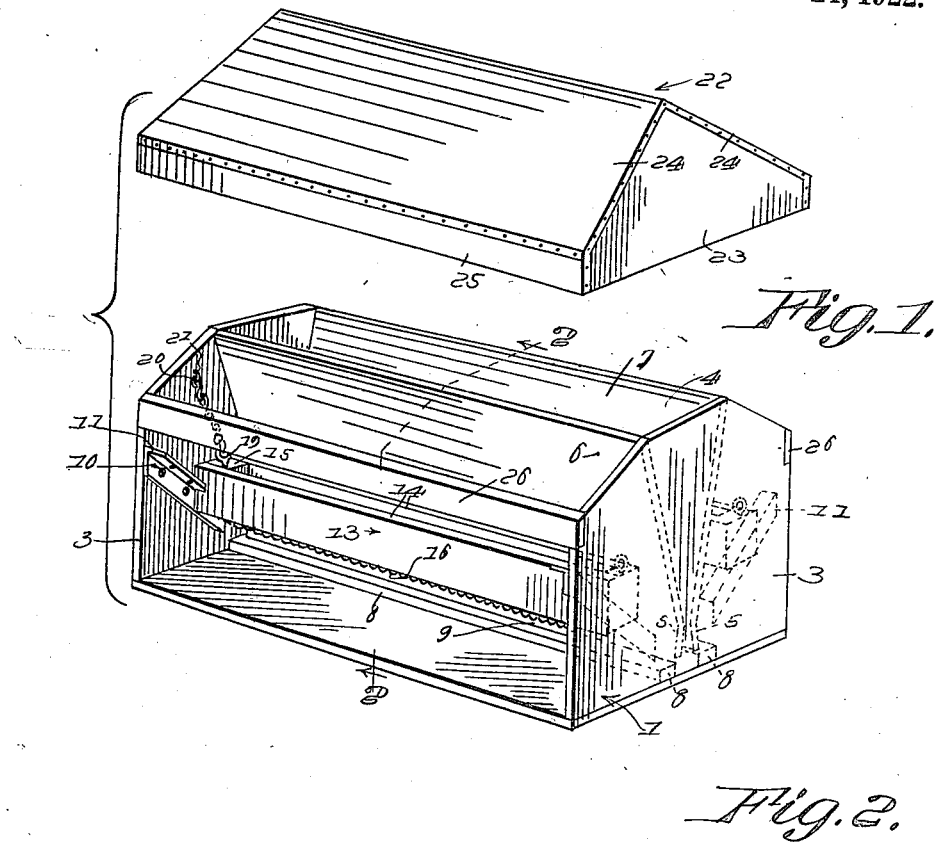
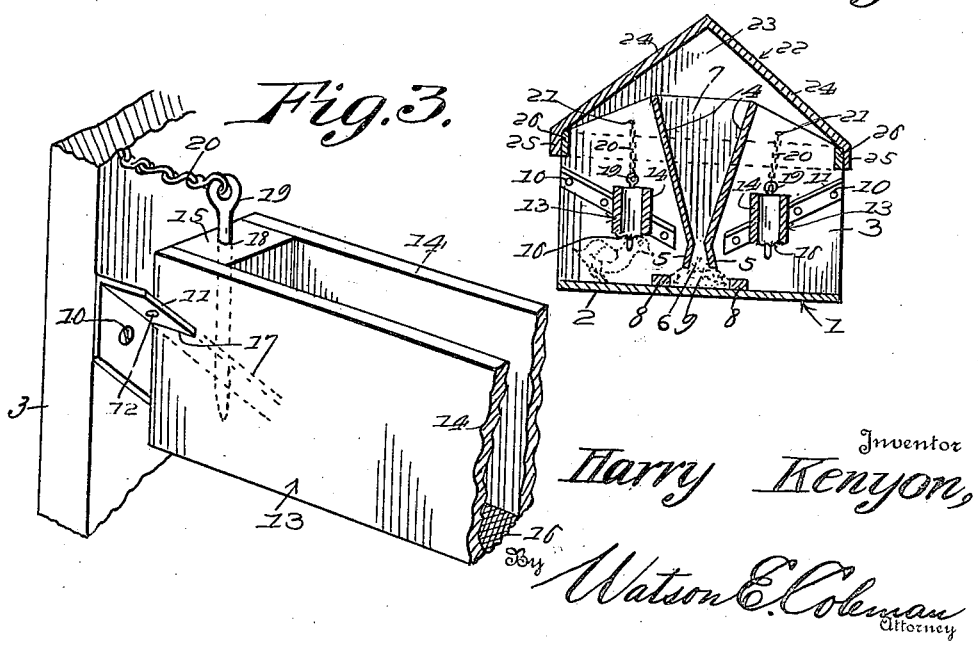
Inventor
Harry Kenyon,
By Watson E. Coleman
Attorney Patented Oct. 24, 1922.

1,433,081

UNITED STATES PATENT OFFICE.

HARRY KENYON, OF FOREST HILL, MARYLAND.

POULTRY FEEDER AND DISINFECTOR.

Application filed November 7, 1921. Serial No. 513,445.

*To all whom it may concern:*

Be it known that I, HARRY KENYON, a citizen of the United States, residing at Forest Hill, in the county of Harford and State of Maryland, have invented certain new and useful Improvements in Poultry Feeders and Disinfectors, of which the following is a specification, reference being had to the accompanying drawings.

The greatest drawback to poultry raisers or keepers is vermin, such as lice and the like, and while there have been devised various constructions of disinfectors, there have been none of practical construction to reach the commercial market, in fact none that will effectively apply a disinfectant to the poultry. Therefore, it is the purpose of the present invention to provide a simple, efficient and practical construction of a combination feeder and disinfector for poultry, in order to exterminate the vermin.

Another and a most important purpose is the provision of a device of this kind, wherein a feeder is included, so that while the poultry are feeding, a disinfectant may be automatically applied to their backs, without in any way frightening them.

While there are several different brands of disinfectant powders manufactured, which up to the present time are sprinkled by hand upon the backs of the poultry due to the absence of a practical disinfectant apparatus, there is no means by which these powders may be effectively sprinkled on the poultry. Hence a still further purpose is to provide a device of this kind, wherein tills or compartments are arranged in a feeder, so that while the poultry are feeding, their backs may rub against the wire fabric bottoms of the tills or compartments, and thereby cause the disinfectant to automatically discharge upon the backs, for the purpose of exterminating the vermin.

A further purpose is to provide a sanitary self-feeder, to which the poultry will be enticed or drawn due to the feed therein.

A still further purpose is to provide a combination feeder and disinfector apparatus, wherein the disinfectant containing tills or receptacles are adjustable, in order to apply the disinfectant to all sizes and ages of poultry, for the purpose of killing or exterminating the vermin on the poultry.

Additionally the invention aims to provide a combination feeder and disinfector apparatus, which can be used indoors, and also outdoors, especially in poultry yards, and including a cover, so as to protect the feed and the disinfectant, which would otherwise be exposed to the bad weather.

Also the invention aims to provide a device of this kind which may be manufactured comparatively cheap and sold at a reasonable profit, and can be expeditiously assembled, in order to be effective and operative for different sizes of fowl.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of the improved combined feeder and disinfector constructed in accordance with the invention, and showing the cover or top thereof spaced above the apparatus in a position ready to be lowered;

Figure 2 is a transverse sectional view on line 2—2 of Figure 1, but showing the cover or top lowered and engaging the apparatus, and Figure 3 is an enlarged detail perspective view showing how either end of one of the disinfectant tills or receptacles is adjustably connected to the end of the feeder.

Referring to the drawings, 1 designates the frame of the combination feeder and disinfector apparatus, which comprises a bottom or base board 2, the ends 3, and the opposed feed hopper boards or pieces 4. These boards or pieces 4 are connected to the ends of the frame in any suitable manner (not shown), and are also converged downwardly, thereby providing a hopper. Arranged adjacent the lower edges of the boards or pieces 4, and also connected to the ends of the frame are outlet throat boards or pieces 5. These pieces 5 are more or less in the form of strips, and are arranged to diverge downwardly. The meeting edges of the strips or pieces 5 and the boards or pieces 4 are arranged comparatively close, in order to provide a relatively narrow outlet mouth 6, through which the feed of any suitable character (which is supported in the hopper 7) gradually falls.

Secured in any suitable manner on the bottom or base 2 of the frame, longitudinally thereof are elongated strips 8, which are relatively spaced to provide a channel or feed trough 9, into which the feed from the hopper 7 falls.

It will be noted that the poultry may approach the feed trough or channel from either side of the feeder apparatus, and in either case they will have free access to the feed.

Secured on the inner faces of the ends 3 of the frame by any suitable means, preferably by screws 10 are angle strips 11. The strips at each end are arranged on either side of the hopper 7, and are disposed convergently downward toward the lower part of the hopper 7. The lateral flanges of the angle strips 11 are provided with a plurality of openings or apertures 12.

In order to effectively apply the disinfectant to the backs of the poultry it is the aim to provide disinfectant containing tills or receptacles 13. These tills or receptacles are of elongated form, extending longitudinally of the frame, one on each side of the central hopper 7. Each till or receptacle comprises the side pieces 14 and the end pieces 15, which are secured together in any suitable manner (not shown). The lower portions of the tills or receptacles are open, but are covered by means of a strip of wire fabric or the like 16. The disinfectant material is placed in the tills or receptacles, and owing to the wire fabric bottoms being more or less pliable and of a fine gauge mesh, the disinfectant powder will sift through upon the backs of the poultry, particularly owing to the backs rubbing against the wire fabric, in such a manner as to jolt or flex the fabric bottoms, in order to create a sifting movement of the disinfectant material.

The ends of the tills or receptacles have slots 17, which extend diagonally across the ends correspondingly to the divergent relation of the angle strips 11, so that the lateral flanges of the strips may engage the slots, obviously the tills or receptacles may be adjusted downwardly and convergently relatively to each other, and may be held in different positions, according to the height of the poultry. The end pieces 15 of the tills or receptacles have vertical openings 18 for the reception of the pins 19, which are suspended from chains 20, which are in turn connected at 21 to the end pieces 3 of the frame. As previously stated the tills or receptacles may be adjusted divergently downwardly toward each other, and in order to hold them in different positions, the pins or keys 19 are inserted through the openings 18, and through certain of the openings or apertures 12 of the lateral flanges of the angle strips 11. It will be noted that the tills or receptacles are so supported in the frame of the feeder and disinfector apparatus, that they are at all times under the cover or top 22, in order to protect the disinfectant material from the weather. This top or cover comprises the end pieces 23, the inclined top pieces 24 and the side pieces 25. The top or cover fits down over the frame of the feeder and disinfector apparatus, until the diverging inclined edges of the end pieces contact with the inclined top or cover pieces 24. To additionally reinforce the frame of the combined feeder and disinfector apparatus, the longitudinally extending side strips 26 are arranged to connect the end pieces 3. It will be noted that these strips 26 are inset in the end pieces 3, in order to insure a rigid construction.

Obviously the feed in the trough or channel 9, as well as the disinfectant material are free from being exposed to the moisture and the weather, while the feeder and disinfector apparatus is used outdoors, such as in poultry yards. However, it is obvious that the feeder and disinfector apparatus may be used inside the poultry houses and the like. The various parts of the apparatus may be constructed of any suitable material, either wood, fibre, metal or the like.

The feed from the hopper 7 gradually discharges from the mouth 6 through the throat 4, and into the trough or channel 9, so that it is readily accessible to the poultry from either side of the feeder. While the poultry are in the act of feeding, their backs or other parts thereof may rub against the wire fabric, in order to flex or indent the fabric bottoms, causing the disinfectant material to sift through. In fact instead of the wire fabric a thin gauze of any suitable material may be used preferably, in view of the fact that the gauze will more readily vibrate or cause the disinfectant material to sift through when the backs of the fowl come in contact therewith.

The invention having been set forth, what is claimed is:—

1. In a combined feeder and disinfector apparatus, a frame having a central longitudinally extending feed hopper, and a pair of disinfectant containing tills mounted in the frame for adjustment in different converging planes toward the hopper, whereby the disinfectant material may sprinkle upon the backs of the poultry while feeding from the bottom of the hopper.

2. In a combined feeder and disinfectant apparatus, a frame provided with a longitudinally extending feed hopper, a pair of disinfectant tills supported by the frame above and offset from the opposite sides of the longitudinal hopper and provided with fabric gauze bottoms, through which the disinfectant percolates, due to the backs of the poultry agitating the bottom, and means for holding the tills in different adjusted positions convergently downward toward and from the longitudinal hopper.

3. In a feeder and disinfector apparatus, the combination with a frame provided with a central longitudinally extending feed hopper provided with feed discharge openings on opposite sides at the bottom thereof, of guides on the opposite ends of the frame converging downwardly and toward the lower portion of the hopper, a pair of disinfectant containing tills mounted on said guides for movements toward and from the lower part of the hopper, means for holding said tills adjustably on the guides, said tills having pliable bottoms through which the feed percolates upon the backs of the poultry, due to the backs engaging therewith and agitating the same.

In testimony whereof I hereunto affix my signature.

HARRY KENYON.